(12) United States Patent
Hingoranee et al.

(10) Patent No.: US 7,519,169 B1
(45) Date of Patent: Apr. 14, 2009

(54) SYSTEMS AND METHODS FOR MANAGEMENT AND DISSEMINATION OF INFORMATION FROM A CONTROLLED ENVIRONMENT FACILITY

(75) Inventors: Rajesh R. Hingoranee, Plano, TX (US); Richard Falcone, Addison, TX (US); Randy Hoffman, Plano, TX (US); Luke Keiser, Frisco, TX (US); Marc Hite, Plano, TX (US); Lee R. Johnson, Plano, TX (US); Michelle L. Davis, Plano, TX (US)

(73) Assignee: Evercom Systems, Inc., Dallas, TX (US)

( * ) Notice: Subject to any disclaimer, the term of this patent is extended or adjusted under 35 U.S.C. 154(b) by 927 days.

(21) Appl. No.: 10/952,327

(22) Filed: Sep. 28, 2004

(51) Int. Cl.
*H04M 15/00* (2006.01)

(52) U.S. Cl. .............................. 379/114.13; 379/114.2; 379/114.21; 379/114.23; 379/144.01

(58) Field of Classification Search ............ 379/114.01, 379/114.1, 114.13, 114.2, 114.21, 114.22, 379/114.23, 144.01, 144.02, 210.02, 211.02
See application file for complete search history.

(56) References Cited

U.S. PATENT DOCUMENTS

| 5,448,625 | A | * | 9/1995 | Lederman | 379/88.25 |
|---|---|---|---|---|---|
| 5,655,013 | A | * | 8/1997 | Gainsboro | 379/188 |
| 5,970,124 | A | * | 10/1999 | Csaszar et al. | 379/88.18 |
| 6,611,583 | B1 | * | 8/2003 | Gainsboro | 379/188 |
| 7,158,621 | B2 | * | 1/2007 | Bayne | 379/114.13 |
| 2003/0236751 | A1 | * | 12/2003 | Settle, III | 705/51 |

OTHER PUBLICATIONS

U.S. Appl. No. 10/135,878, Viola et al.
U.S. Appl. No. 10/190,315, Falcone et al.
U.S. Appl. No. 10/360,248, Falcone et al.
U.S. Appl. No. 10/698,576, Falcone.
U.S. Appl. No. 10/720,732, Viola et al.
U.S. Appl. No. 10/720,848, Violla et al.

* cited by examiner

*Primary Examiner*—Binh K Tieu
(74) *Attorney, Agent, or Firm*—Slater & Matsil, L.L.P.

(57) ABSTRACT

Systems and methods for the dissemination of information from a controlled environment facility employ facility information management functionality managing resident information and facility information, and call manager functionality selectively providing at least a portion of the resident information and/or the facility information to an outside party in an automated manner. The invention may employ outgoing IVR functionality to provide select portions of the resident information in response to the call manager recognizing that a call is a first call by a resident, or a first call to a particular telephone number by a resident. The invention may manage information related to providers of services or goods for residents of a facility, provide an outside party this information, and notify a selected provider of selection of that provider by the outside party to provide goods or services for a resident.

50 Claims, 3 Drawing Sheets

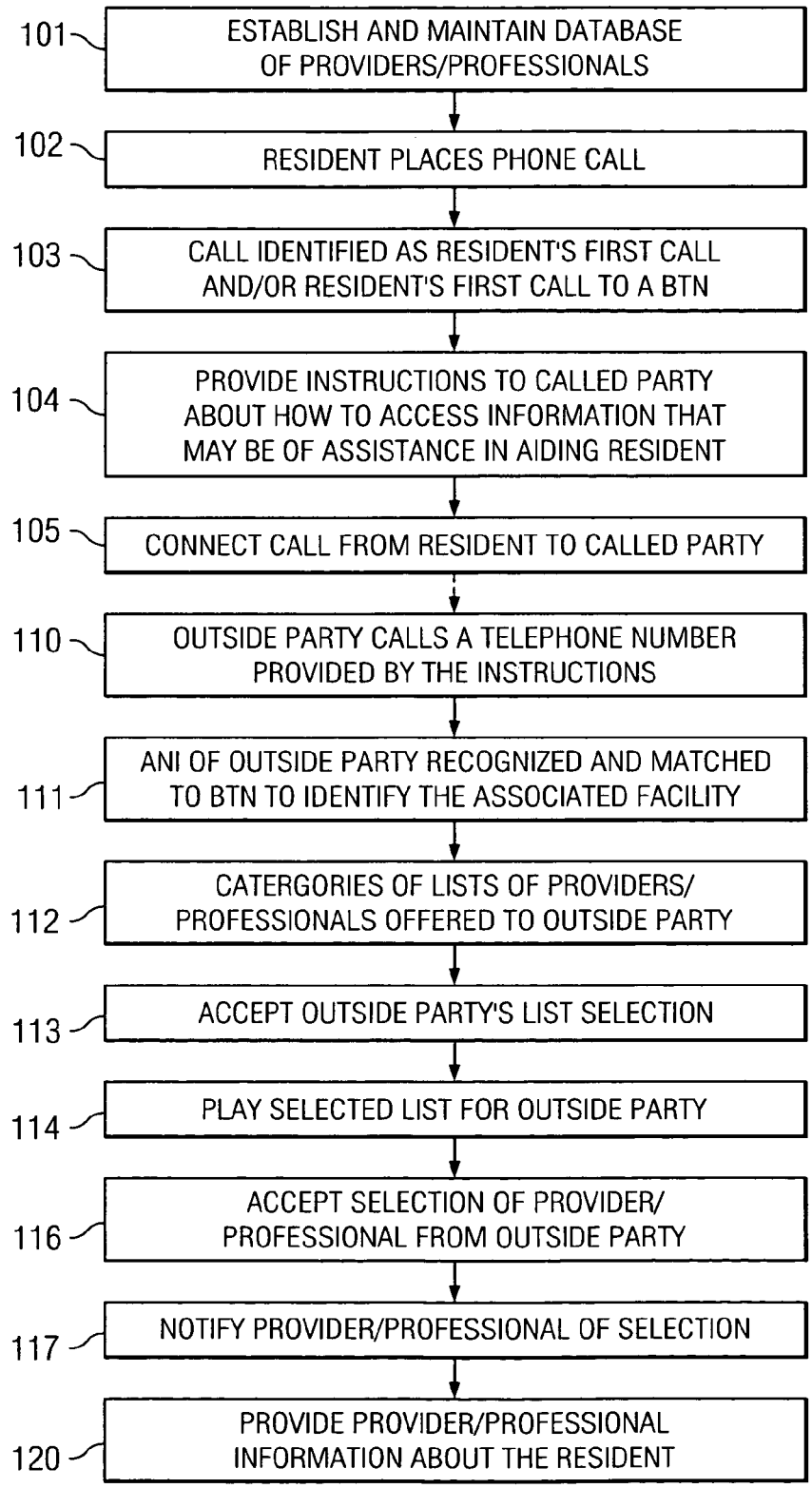

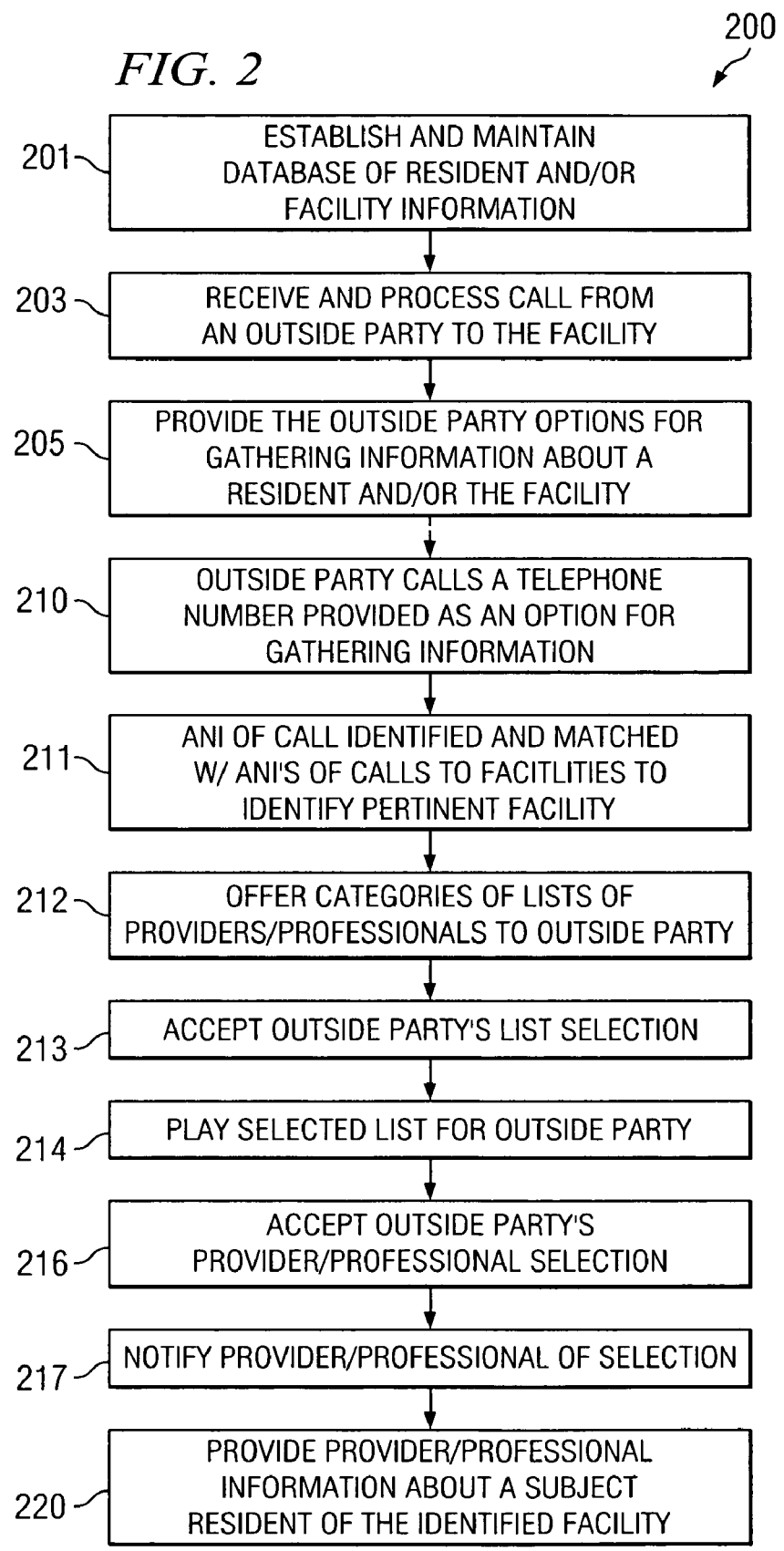

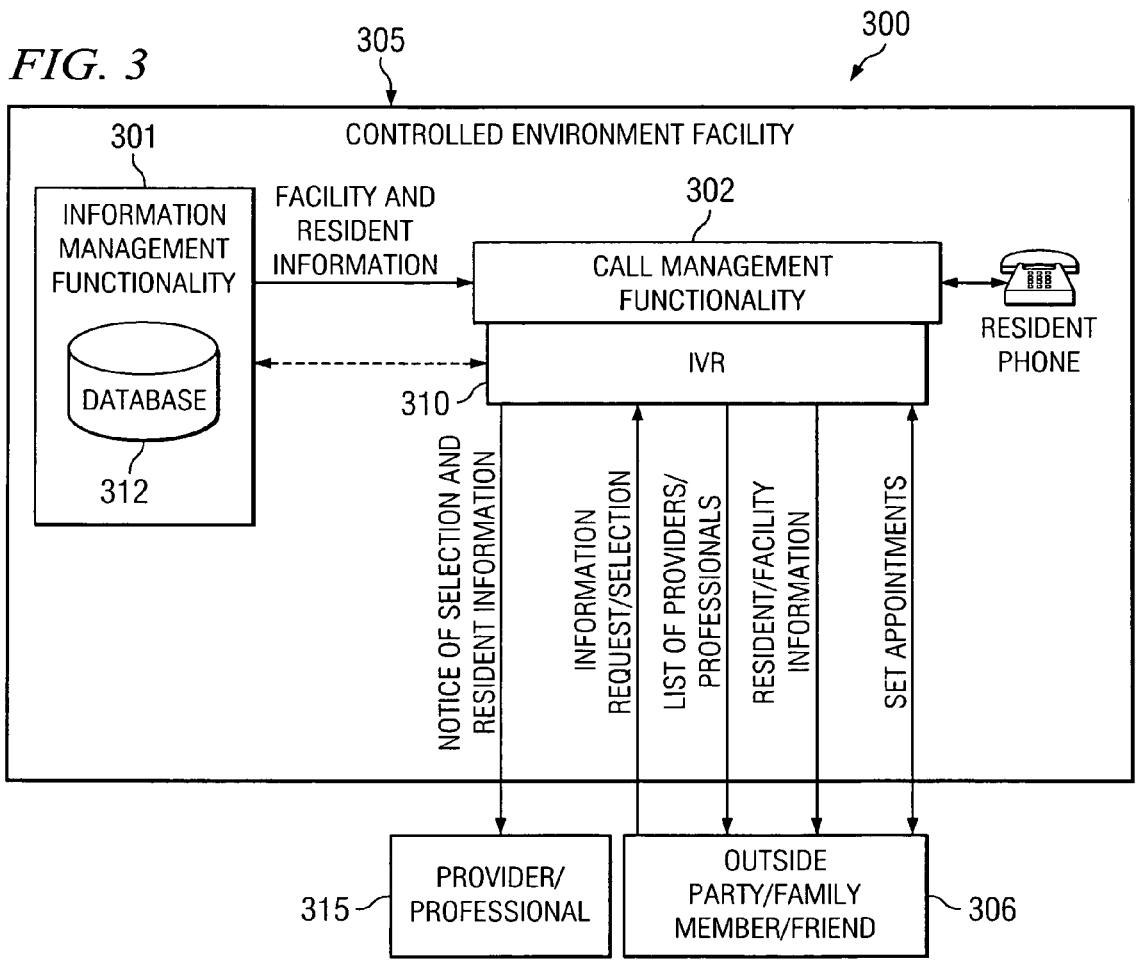

SYSTEMS AND METHODS FOR MANAGEMENT AND DISSEMINATION OF INFORMATION FROM A CONTROLLED ENVIRONMENT FACILITY

CROSS-REFERENCE TO RELATED APPLICATIONS

The present application is related to the following co-pending U.S. patent applications: Ser. No. 10/360,248, entitled "SYSTEM AND METHOD FOR ACCOUNT ESTABLISHMENT AND TRANSACTION MANAGEMENT USING INTERRUPT MESSAGING"; Ser. No. 10/190,315, entitled "SYSTEM AND METHODS FOR OFFERING A SERVICE TO A PARTY ASSOCIATED WITH A BLOCKED CALL"; Ser. No. 10/698,576, entitled "REVENUE MANAGEMENT SYSTEMS AND METHODS"; and Ser. Nos. 10/135,878, 10/720,732 and 10/720,848 each entitled "INFORMATION MANAGEMENT AND MOVEMENT SYSTEM AND METHOD". The disclosure of each of these applications is incorporated herein by reference.

TECHNICAL FIELD

The present application broadly relates to telecommunication systems and specifically to systems and methods for the management and dissemination of information from a controlled environment facility.

BACKGROUND OF THE INVENTION

Management and dissemination of information are typically at the forefront of the administrative burdens for controlled environment facilities. Controlled environment facilities, as used herein, may include inmate facilities (e.g., municipal jails, county jails, state prisons, federal prisons, military stockades, juvenile facilities, and detention camps), or hospitals, nursing homes, camps, schools, and the like. An example of the aforementioned administrative burden in a correctional institution or detainment facility such as a county or municipal jail might arise when an individual is booked in as an inmate of the facility and questions are directed to that facility from friends, family, attorneys, and the like. Typically, a great number of questions, commonly from a number of telephone calls or visits, are directed to the facility's booking personnel asking for details related to the newly booked inmate and his circumstances. However, controlled environment facilities, particularly inmate facilities, may wish to avoid contact with friends and family because in many cases these friends or family members are emotional, and the facility administrators may wish to avoid conflict. Similarly, information about the facility, such as visitation hours, location and the like, is constantly being sought by the public, friends and family of residents, or the like. Typically controlled environment facilities do not employ automated information systems or the like. Additionally, scheduling visitation from friends, family and others, use of commissary facilities, and the like, raise other administrative functions to burden the facility. Managing transactions within a jail or the like, such as commissary deposits, medical payments, connecting with bail bondsmen, scheduling meetings and court dates with an attorney, and the like become tedious tasks for facility administrators.

Controlled environment facilities may have goods and service providers or service professionals registered or otherwise eligible to provide goods or services to residents of the facility. Examples of such service providers or professionals may include attorneys, bail bondsmen, and the like, registered or eligible to provide services to the residents of a municipal or county jail. Such professionals typically need to communicate with the jail to obtain information about clients and potential clients, as performance of services dictate. Typically, such professionals or service providers must place a telephone call to the facility to obtain information or such information must be obtained in person or through the mail. For example, in the case of a municipal or county jail, a bail bondsman might need to determine the charges against a suspect and any bond amounts or conditions that may have already been set. Attorneys may need similar information as well as information concerning court dates and the like. To obtain such information a profession might need to contact multiple parties. The dissemination of information to goods and service providers or service professionals may be a burden on the facility and obtaining this information may be time consuming for the provider or service professional.

As pointed out above, family members or friends typically desire information related to a resident of a controlled environment facility. For example, when a relative calls to obtain information related to a person recently arrested, such as charges, opportunities for visitation, personal item needs and the like, they speak to a booking officer or similar personnel in the jail. The booking officer may direct the friend or family member to somebody else to obtain some of the requested information. Several calls may be required to gather the desired information. Thereafter, the family or friends of the detained party may need to look for professional assistance for the detainee. For example, the friends or family may seek out the services of a bail bondsman and/or attorney. This may require research or at least consultation of a telephone directory, advertisements, or the like. Typically, the friends or family members would then need to confer with the professional(s) to determine if the professional(s) may be of assistance in this particular case. If assistance is not available from that professional, such as due to technical or time constraints (i.e. the professional is not registered with the facility, does not handle the types of matters involved, has other obligations of his or her time, or the like), then the friends and family must continue their search for assistance. Such a process is quite time consuming, often requiring days to complete. However, service professionals, and the like, oftentimes depend on calls coming from residents of a facility, or from friends or family of these residents, seeking their services.

SUMMARY

The present invention is directed to systems and methods which facilitate communication among a resident of a controlled environment facility, friends/family and a professional or other provider of goods or services, who is in a position to be of assistance. The present systems and methods may enable a controlled environment facility communications provider, or the like, to become, in effect, a broker of information for friends and families of facility residents that need assistance from outside the facility, and, in effect, an agent for professionals who can provide that assistance. The present systems and methods preferably provide real-time, delayed, displaced, and/or transformed connection to a professional through multiple paths, including, by way of example, electronic mail, paging, voice messaging, text messaging, telephone call to wireless device and telephone call to wire-line device. The present systems and methods may also facilitate management of funds associated with the services provided by the professionals. Preferably, the present systems and methods employ automated technologies leveraged to provide the aforementioned features. For example, interrupt messaging such as disclosed in U.S. patent application Ser. No. 10/360,248, entitled "System and Method for Account Establishment and Transaction Management using Interrupt Messaging," incorporated herein by reference above, may be used.

Preferably the present systems and methods electronically manage and support the management and dissemination of information in a controlled environment facility to alleviate the challenges faced by facility personnel inundated with calls from outside the facility from families and friends of residents. The present systems and methods preferably extend technological solutions to offload repetitive administrative functions using digital/electronic systems and methods. The present systems and methods preferably employ a "follow me" approach to connect parties outside a facility (such as friends and family) with professional entities or individuals (such as bail bondsmen, attorneys, Probation Officers, etc) wherein a series of communication mediums are used in an attempt to contact the professional in as timely manner as possible. The present systems and methods may leverage the functionality disclosed in above incorporated U.S. patent application Ser. No. 10/360,248. Utilizing the "follow me" approach, the present invention helps a facility develop effective business processes to alleviate the vast number of administrative tasks related to managing information, transactions, interaction with external parties such as the public at large, friends, family, outside goods and service providers, attorneys, bail bondsmen, and the like.

The present systems and methods alleviate the management and dissemination of information burdens and similar tasks normally handled by facility personnel, by developing and implementing methodologies to offload such tasks to electronic systems and methods and reduce or eliminate human interaction. The present systems and methods enable a controlled environment facility to efficiently and securely manage and disseminate information, perform administrative tasks, and manage time effectively. For example, information and tasks handled by the present systems and methods may include resident information, facility information, financial transactions, administrative tasks, professional service provider related activities and information, friend and family issues, and the like. To that end the present systems and methods offload select administrative tasks, both within the facility and outside, to electronic and/or digital systems and methods.

The present systems and methods may make use of facility management functionality, which may be provided in conjunction with an "Information Management and Movement System and Method" such as disclosed in U.S. patent application Ser. Nos. 10/135,878, 10/720,732, and 10/720,848, the disclosures of which are incorporated by reference above. Thereby, the present invention may manage resident information, such as a reason for being in the facility, personal information, intake or booking information, time spent at the facility, appointments, etc. The present invention may also manage facility information, such as visitation hours, administrative information, etc. Additional information, such as may be related to or pertain to outside parties, such as bail bondsmen, attorneys, family, probation officers, etc. for an incarceration facility example, may be managed in accordance with the present invention.

In accordance with embodiments of the present invention, when a resident uses a resident telephone system, the present systems and methods may, particularly for a first telephone call made to a telephone number, generate an outgoing interactive voice response (IVR) message providing select information to the called party. Such an interrupt message may be provided in accordance with the disclosure of U.S. patent application Ser. No. 10/360,248, and U.S. patent application Ser. No. 10/190,315, entitled "System and Methods for Offering a Service to a Party Associated with a Blocked Call," both of which are incorporated by reference above. Information provided by the interrupt message might include information about the resident such as identity and reason for being in a facility, directions to a website where additional information can be found, and/or a telephone number that the called party can call to obtain additional information. This telephone number to call may be a "900" number or other toll number that will require the called party to pay a certain amount, such as per minute, when using this number to obtain this additional information.

The present systems and methods ensure that service professionals and the like, who are looking for business from residents of a facility, are connected in a timely manner, and preferably in an automatic manner, as opposed to waiting for a resident's friend or family to call. Likewise, the present invention enables a resident's family member or friend to be connected with a professional to facilitate providing the professional's service(s) to the resident.

The present invention provides benefits to the facility as well. The present systems and methods reduce administrative burdens on the facility not only by handling inquiries, but, by way of example, facilitating release of a detainee. The present systems and methods preferably enable a facility such as a municipal or county jail to facilitate bailing a detainee out, thereby reducing burdens and expenses of the jail by keeping the detainee population low.

Friends, family or other parties related to a resident calling the facility may be looking for information related to a new resident. As discussed above, such calls have typically been taken by facility personnel who may have some booking information on the inmate. However, in accordance with the present systems and methods such calls may be directed by an IVR system to access electronically stored information or to personnel who have the desired information more readily available. For example, in accordance with the present invention, a caller to a city or county jail may be presented with options such as "press 1 for inmate booking information, press 2 for facility hours, press 3 for visitation hours" and/or the like. Advantageously, the present invention eases administrative burdens on facility personnel and aids in eliminating conflicts that the facility personnel may have with the calling party, such as an inmate's family member.

Additionally, the time outside service providers spend on the telephone with the facility can be considerably minimized using technology that automatically provides needed information or that directs them to a resource for such information. Similarly, the facility's time on the telephone is minimized. For example, if an attorney calls a city or county jail to set up an appointment with an inmate, the IVR system can direct the attorney to the inmate database and provide scheduling information such as doctor's appointments, court appointments, or the like.

An IVR may link to the call manager functionality, enabling a function to be carried out by the calling party electronically. Linking such functionality to the capabilities of a call manager may allow a calling party to activate any of a number of functions by pressing a number, or in a similar manner. By way of example such function may include pre-arranging visitation hours, making commissary account deposits, ordering or refilling prepaid calling cards for a resident, obtaining resident information, providing credit card information for use in funding commissary accounts, managing debit or other accounts, and/or the like.

An IVR may also, or alternatively be linked to the aforementioned facility management functionality. The facility manager may be linked to an outgoing IVR for purposes such as tracking a resident's activities or use of facility services. For example, when a family member or friend calls into a jail to set up visitation appointments, the facility manager may determine an inmates' eligibility for visitation, and a database in the facility manager may manage the activities of the inmate, accordingly.

In most cases, when a friend or family member calls into a controlled environment facility, the first portion of the telephone call is spent on "lead-in" questions such as the name of the individual calling, etc. In accordance with the present invention an IVR system can be configured to direct the caller to another number where desired information may be available. For example, in the context of a county or city jail, the caller may be redirected to a telephone number of a person or system that can provide an inmate's booking information. However, in at least one embodiment, such functionality may be linked to the facility manager, which may maintain most, if not all, resident information. In accordance with the present invention, a friend or family member calling in may be directed to a number or be provided information on the resident automatically. The caller may also be directed to a number to dial or to punch where they can then access a commissary account for the resident. Therethrough, the caller may establish a commissary account and/or deposit funds for the resident to use.

Oftentimes, when a friend or family member calls a controlled environment facility to inquire about a new resident, the caller will wish to inquire about various services provided by outside parties for residents of the facility. For example, a family member calling a city or county jail may wish to inquire about the services of a bail bondsman or an attorney. In accordance with the present invention, the aforementioned facility manager may store information related to local service providers, such as local bail bondsmen and attorneys offering services available to an inmate of the facility. An IVR message can direct the family member to a list of bail bondsmen, a list of attorneys, or the like.

Once a listed outside service provider, such as a bail bondsman or attorney, is selected by the caller, the facility manager can forward an email message to the selected service provider, or utilize another medium of communication, such as may have been previously selected by the service provider, to contact the service provider. Preferably, the present systems and methods provide a professional access to a central IVR system, where the professional may call and access their messages. These messages may have previously been sent to the professional automatically as discussed above. Thus, the present invention provides a three-way connectivity by connecting the resident with friends or family, and the friends or family with a professional for the provision of services.

The present system and methods may generate revenue for a practitioner of the present invention by charging the professional a subscription rate for access to obtain information stored in the database. Revenue may be generated for a party practicing the present invention by charging the outside service provider a flat rate for a listing on the IVR system. Additional revenues may be generated by charging a premium for expanded listings on the IVR system, or providing an outside service provider "top-billing." Revenues may be generated by charging calling parties a per-call, or per-minute, rate for a 900-telephone number to access the IVR system. Revenues may further be enhanced through reduction of potential bad debt, such as through providing an incentive to outside service providers to prepay for listings using prepaid services such as associated with "Revenue Management Systems and Methods" disclosed in U.S. patent application Ser. No. 10/698,576.

Thus, the present invention may provide revenue from listing fees paid by professionals and/or fees associated with accessing the information, paid by a caller using a "900" number to access information. The present invention reduces administrative and personnel costs in facilities through automation of tasks presently completely in a manual, labor-intensive, time-consuming manner. Additionally the present invention reduces administrative, personnel and advertising costs for professionals who subscribe to the service and help them manage incoming new business inquiries.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 is a flow chart of an embodiment of the present methods;

FIG. 2 is a flow chart of another embodiment of the present methods; and

FIG. 3 is a diagrammatic illustration of embodiments of an information management system and a call management system adapted to employ embodiments of the present systems.

DETAILED DESCRIPTION

FIG. 1 is a flow chart of embodiment 100 of the present methods for the management and dissemination of information in a controlled environment facility. In accordance with embodiment 100 a professional who provides services to residents of a controlled environment facility is included in an automated IVR-provided list of available professionals at 101. This list may be maintained as a database and may be associated with a facility and its surrounding area. In accordance with the present invention lists may be targeted to Billing Telephone Numbers (BTNs) who receive calls from residents of the particular facility. In other words, regardless of the geographical location of the BTN receiving a call, a list, or lists, provided to a called party will preferably be specific to the facility from which they received the call. A professional who is registered or otherwise eligible to provide goods and/or services to residents of a controlled environment facility may compensate a controlled environment facility communication service provider to be included in such an IVR-provided list of available professionals. Added compensation may be required of a professional to place "taglines" or similar advertising material with the listing or to move a professional to a top of a list.

A resident may place a telephone call to an outside party at 102. By way of example, during the booking process, a detainee may be allowed to place a telephone call, such as to a friend or family member. This telephone call may be placed using a telephone provided by the aforementioned controlled environment communication service provider using a call manager functionality. Preferably, in accordance with the present systems and methods the call manger functionality identifies the telephone call as the first call to a BTN, and/or as the first call by the new resident, at 103.

At 104, before the connection is completed, the called party is provided an automated message that provides instructions for accessing information that may be useful to the called party in providing assistance to the calling resident. Such information may include a telephone number and/or website address to access for information concerning the resident's circumstance or status and a listing of outside service providers who may be of assistance to the resident. This message to the called party may be provided by an IVR associated with the aforementioned call manager functionality. Preferably at 105 the call from the resident to the outside party (friend or family member) is connected.

Subsequently, the called party, such as a friend or family member may, at 110, call the telephone number provided in the preamble telephone message at 104. The call at 110 preferably accesses a centralized platform that recognizes the incoming Automatic Number Identification (ANI), matches it with the first call (at 102) to identify the associated facility, and initiates an IVR message at 111. Preferably the IVR message at 112 offers the friend or family member categories of professionals from which to select a list to review. The categories for a detention facility such as a city or county jail might include bail bondsmen, attorneys, probation officers, etc. A similar list for a nursing home facility or the like might include a listing of doctors, pharmacies, beauticians, cable television providers, specialty furniture retailers or rental centers, etc. The friend or family member may select a category at 113 and at 114 the IVR plays a list of professionals in that category. Preferably, the list includes service providers local to the area where the facility identified in step 111 is located and/or providers who are approved or otherwise acceptable to the facility.

At 116 the friend or family member selects a professional from the list and at 117 that professional is notified in accordance with the present systems and methods in a manner that the professional previously opted to be notified, such as when signing up for the service. The notification at 117 may include direct connection upon selection via wire-line or wireless phone, email, voice mail, or the like. Further, the notification at 117 may employ a "follow me" approach wherein a series of communication mediums are used in an attempt to contact the professional in as timely manner as possible. For example if a direct phone call to an office wire-line phone fails to reach a live recipient, a call to a wireless phone may be initiated, if that call fails to reach the desired individual or person related to the business an email and/or a page may be sent. At each point along this path voice mail or other messages may be left with pertinent information such as a call back number or website address to access for information.

At 120 the provider is preferably provided information about the resident and the services required. The information provided to the provider preferably includes the name of the resident, any necessary identification number or the like, a reason for being in the controlled environment facility, and other data pertinent to provision of the goods or services of the provider. By way of example, a bail bondsman may receive such a notification via email, or may be directed to access information via a web page, via a telephone message, beeper message or the like. A form may be provided for the bail bondsman that can be filled out from the information received. The bail bondsman can print out this form and take it to the facility to begin the bail process. This functionality may be extended to the provision of bail money to the facility. Similar functionality can be extended to attorneys, probation officers, and the like. Additionally or alternatively, a fee may be charged for the professional to access information about a resident for whom the professional has been selected to provide services. This fee may take the form of a subscription and may be associated with the aforementioned listing fee or the fee may be a one time fee that may be paid at the time the information is accessed, such as via a "900" call or use of a credit card.

FIG. 2 is a flow chart of another embodiment (200) of a method for dissemination of information related to a resident of a controlled access environment facility in accordance with the present invention. At 201 a database of information about residents of the controlled access environment facility is established. At 203 a telephone call from an outside party to the controlled access environment facility is received and processed. At 205 an interactive voice response unit or similar functionality is used to provide the outside party automated options for gathering information. This information may be information about the controlled environment facility, one of the residents, providers that provide goods or services to residents of the controlled access environment facility and/or other information. The options provided at 205 for gathering information may include providing the outside calling party a website address or a telephone number, which may be a "900" service phone number.

At 210 a call from the outside party to a telephone number provided at 205 may be received and processed. At 211 an automatic number identification associated with the outside party is preferably identified and matched with an automatic number identification associated with the call to the controlled environment facility to identify the associated controlled environment facility. At 212 the outside party may be provided categories of lists of providers providing goods and/or services to residents of the identified facility. By way of example, if the identified facility is a detention facility, the categories of lists might include bail bondsmen, attorneys, probation officers, and the like. At 213 the outside part preferably selects at least one of the categories and at 214 a list of providers in the selected category is played for the calling party. The providers listed may be local to a geographic area of the identified facility and/or registered or otherwise eligible to provide goods and/or services to the residents of the identified facility. These providers may pay a fee to be included in one of the lists. Additional fees may be paid to include additional information about the provider in a list. For example the additional information may include a "tagline" or the like provided by the goods or service provider. Alternative, or additional, fees may be paid by a provider to be presented at a beginning of a list.

At 216 the calling party may select a provider from the played list. Resultantly, the selected provider is notified at 217 of their selection and at 220 the selected provider is preferably provided information about the resident. The provider may be notified at 217 in a manner preselected by that provider, such as via telephone, wireless phone, email, voice mail, and/or the like. The information provided at 220 may include the name of the resident, any identification number associated with the resident, the reason the resident is in the controlled environment facility, and/or the like. Similarly as discussed above in relation to embodiment 100, the notification at 217 may employ a "follow me" approach wherein a series of communication mediums are used in an attempt to contact the professional in as timely manner as possible and at each point a voice mail or other messages may be left with pertinent information such as a call back number or website address to access for information. Also similar to as discussed above in relation to embodiment 100, the provider may be charged a fee to access this information.

FIG. 3 is a diagrammatic illustration of embodiments of an information management system 301, and a call management system 302, adapted as example embodiment 300 of the present systems. Controlled environment facility information management functionality 301 preferably manages resident information and facility information for controlled environment facility 305. In accordance with embodiments of the present systems controlled environment facility call manager functionality 302 selectively provides resident information and/or selectively provides facility information to outside party 306 in an automated manner.

The resident information provided might include identity of the resident, a reason for the resident to be a resident of the controlled environment facility, booking information for the resident, time spent by the resident at the controlled environment facility, appointments for the resident, identity of family members of the resident, and/or the like. The facility information might include facility visitation hours, facility location facility administrative information and/or the like.

Alternatively or additionally, the present invention may provide outside party 306 directions to a website or telephone number where they may obtain resident information and/or facility information. The telephone number may be a "900" service number, and/or the website may charge a fee for access. IVR functionality 310 may be associated with, or included in call managing functionality 302. This IVR may selectively provide the resident information and/or facility information to a calling or called outside party. The IVR may provide this information during a call with the facility or a resident, or the information may be provided during a call to the aforementioned provided telephone number.

To carry out this dissemination of information the IVR may selectively route an outside call party to personnel who have desired information. Further, the IVR may enable an outside party to pre-arrange visitation with a resident, make deposits in a commissary account of a resident, order or refill prepaid calling cards for a resident, accept credit card information for use in funding a commissary account of a resident, manage a debit or other account associated with a resident, and/or the like. The IVR may be linked to facility information management functionality 301 and may be used to track a resident's activities and use of facility services. This may facilitate setting-up appointments between an outside party and a resident using the IVR. For example, facility information manager 301 may determine if a resident is eligible or available to take part in an appointment or visitation requested via IVR 310 and schedule the visitation or appointment accordingly.

In accordance with the present invention, various steps of the above described method embodiments, 100 and 200, may be carried out by the information management system 301 and or call management system 302. For example, call manager functionality 302 may identify when a resident uses a resident telephone system for a first time and/or when a first telephone call is made to a telephone number. Call manager functionality 302 may include an outgoing IVR functionality. In response to call manager 302 recognizing that a call is a first call by a resident or that a call is a first call to a particular telephone number by a resident, IVR 310 may provide select portions of resident information to the called party. The disseminated resident information might include identity or the resident, reason for the resident being in a facility, and/or the like.

As a further example of information management system 301 and/or call management system 302 carrying out various steps of the above described method embodiments, 100 and 200, information management functionality 301 may manage information related to entities that provide services and/or goods to residents of a facility. By way of example where the facility is a detention facility and the providers comprise at least one of bail bondsmen, attorneys, probation officers, and etc, information manager 301 may maintain database 312 of these professionals. Further, information management system 301 and/or call management system 302 may provide functionality for receiving a call from the outside party to a provided telephone number, functionality for recognizing an ANI associated with the outside party, and functionality for matching the recognized automatic number identification with an automatic number identification associated with the processed telephone call from the resident to the outside party, which identifies the pertinent controlled environment facility. As noted above the IVR associated with call management system 302 and/or information management system 301 may provide the outside party categories of lists of providers authorized to provide goods and/or services to residents of the identified facility. This IVR functionality preferably also accepts selection of one of the categories from the outside party, plays a list of providers in the selected category, and accepts any selection of the outside party of a provider from the played list. The IVR functionality may then be used to notify selected provider 315 of the selection and to provide information about the subject resident to the provider.

In accordance with the present invention information management functionality 301, call management functionality 302 and/or IVR 310 may be located at the facility, as illustrated in FIG. 3. However, information management functionality 301, call management functionality 302 and/or IVR 310 may be located at a central location outside of the facility, disposed in a decentralized manner at several locations, or otherwise located so as to receive or provide telephonic and/or data communications in accordance with the present invention.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for dissemination of information related to a resident of a controlled access environment facility comprising:
   establishing a database of providers that provide at least one of goods and services to residents of said controlled access environment facility;
   processing a telephone call from said resident of said controlled access environment facility to an outside party;
   providing said outside party an automated message that provides a telephone number for accessing information related to said resident;
   receiving a call from said outside party to the provided telephone number;
   recognizing an automatic number identification associated with said outside party;
   matching the recognized automatic number identification with an automatic number identification associated with the processed telephone call from said resident to said outside party;
   identifying a controlled environment facility from which said resident placed said processed call to said outside party;
   providing said outside party with a list of categories of said providers;
   accepting a selection of one of said categories from said outside party;
   playing a list of one or more providers in the selected category; and
   accepting a selection by said outside party of a provider from the played list.

2. The method of claim 1 further comprising:
   identifying said telephone call as a first call by said resident.

3. The method of claim 1 further comprising:
   identifying said telephone call as a first call to a billing telephone number.

4. The method of claim 1 further comprising:
   identifying said telephone call as a first call by said resident to a billing telephone number.

5. The method of claim 1 wherein said providing is carried out before connection of said telephone call is completed.

6. The method of claim 1 further comprising:
   notifying the selected provider of said selection; and
   providing information about said resident to said selected provider.

7. The method of claim 6 wherein said information provided to said provider comprises at least one of an identity of said resident, a reason for said resident to be a resident of said controlled environment facility, booking information for said resident, time spent by said resident at said controlled environment facility, appointments for said resident, and identity of family members of said resident.

8. The method of claim 6 wherein said notifying comprises notifying the provider in a predetermined manner.

9. The method of claim 8 wherein said predetermined manner is at least one of, telephone, wireless phone, email, and voice mail.

10. The method of claim 6 wherein said providers listed in the played list are local to a geographic area of the identified facility.

11. The method of claim 6 wherein said providers listed in the played list are authorized to provide at least one of said goods and services to residents of the identified facility.

12. The method of claim 6 wherein said controlled environment facility is a detention facility and said categories comprise professionals who provide services to arrestees.

13. The method of claim 6 wherein said controlled environment facility is a detention facility and said categories comprise at least one of bail bondsmen, attorneys and probation officers.

14. The method of claim 6 further comprising:
   collecting a fee to include a provider in at least one of said lists.

15. The method of claim 14 further comprising:
   collecting an additional fee to include additional information, about said provider, in said at least one of said lists.

16. The method of claim 14 further comprising:
   collecting an additional fee to include additional information, from said provider, in said at least one of said lists.

17. The method of claim 14 further comprising:
   collecting an additional fee to present a provider at a beginning of said at least one of said lists.

18. A method for dissemination of information related to a resident of a controlled access environment facility comprising:
   establishing a database of information about residents of said controlled access environment facility;
   processing a telephone call from an outside party to said controlled access environment facility;
   providing said outside party a telephone number for gathering information about at least one provider of at least one of goods and services to residents of said controlled access environment facility;
   receiving a call from said outside party to the provided telephone number;
   recognizing an automatic number identification associated with said outside party;
   matching the recognized automatic number identification with an automatic number identification associated with the processed telephone call from said outside party to said controlled environment facility;
   identifying said controlled environment facility as a result of said matching;
   providing said outside party with a list of said providers;
   accepting a selection by said outside party of one of said providers; and
   providing information about said resident to said selected provider.

19. The method of claim 18 further comprising:
   providing said outside party categories of lists of providers providing at least one of goods and services to residents of the identified facility;
   accepting a selection of one of said categories from said outside party; and
   notifying the selected provider of said selection.

20. The method of claim 19 wherein said information provided to said provider comprises at least one of an identity of said resident, a reason for said resident to be a resident of said controlled environment facility, booking information for said resident, time spent by said resident at said controlled environment facility, appointments for said resident, and identity of family members of said resident.

21. The method of claim 19 wherein said notifying comprises notifying the provider in a predetermined manner.

22. The method of claim 21 wherein said predetermined manner is at least one of, telephone, wireless phone, email, and voice mail.

23. The method of claim 19 wherein said providers listed in the played list are local to a geographic area of the identified facility.

24. The method of claim 19 wherein said providers listed in the played list are authorized to provide at least one of said goods and services to residents of the identified facility.

25. The method of claim 19 wherein said controlled environment facility is a detention facility and said categories comprise professionals who provide services to arrestees.

26. The method of claim 19 wherein said controlled environment facility is a detention facility and said categories comprise bail bondsmen, attorneys and probation officers.

27. The method of claim 19 further comprising:
collecting a fee to include a provider in at least one of said lists.

28. The method of claim 27 further comprising:
collecting an additional fee to include additional information, about said provider, in said at least one of said lists.

29. The method of claim 27 further comprising:
collecting an additional fee to include additional information, from said provider, in said at least one of said lists.

30. The method of claim 27 further comprising:
collecting an additional fee to present a provider at a beginning of said at least one of said lists.

31. A system for dissemination of information from a controlled access environment facility comprising:
controlled environment facility information management functionality managing resident information and facility information;
controlled environment facility call manager functionality selectively providing at least one of at least a portion of said resident information and at least a portion of said facility information to an outside party in an automated manner, said call manager functionality providing said outside party a telephone number that said outside party can call to obtain additional resident or facility information;
means for receiving a call from said outside party to the provided telephone number;
means for identifying a controlled environment facility from which said resident placed said processed call to said outside party;
means for providing said outside party categories of providers providing at least one of goods and services to residents of the identified facility;
means for accepting a selection of one of said categories from said outside party;
means for playing a list of one or more providers in the selected category; and
means for accepting a selection by said outside party of a provider from the played list.

32. The system of claim 31 wherein said call manager functionality identifies when a resident uses a resident telephone system for a first time.

33. The system of claim 31 wherein said call manager functionality identifies when a first telephone call is made to a billing telephone number.

34. The system of claim 31 wherein said call manager functionality includes outgoing interactive voice response functionality that provides select portions of said resident information in response to said call manager recognizing that a call is a first call by a resident.

35. The system of claim 31 wherein said call manager functionality includes outgoing interactive voice response functionality that provides select portions of said resident information in response to said call manager recognizing that a call is a first call to a particular billing telephone number by a resident.

36. The system of claim 31 wherein said select portions of said resident information includes at least one of identity or the resident and reason for the resident being in a facility.

37. The system of claim 31 wherein said selectively providing at least one of at least a portion of said resident information and at least a portion of said facility information to said outside party comprises providing said outside party directions to a website.

38. The system of claim 31 wherein said telephone number is a 900 service telephone number.

39. The system of claim 31 wherein said controlled environment facility information management functionality further manages information related to providers of services and goods.

40. The system of claim 39 wherein said facility is a detention facility and said providers comprise at least one of bail bondsmen, attorneys and probation officers.

41. The system of claim 39 wherein said call manager functionality includes an interactive voice response unit selectively routing said calling party to personnel who have at least one of desired resident information and desired facility information.

42. The system of claim 31 further comprising:
means for recognizing an automatic number identification associated with said outside party;
means for matching the recognized automatic number identification with an automatic number identification associated with a processed telephone call from said resident to said outside party;
means for notifying the selected provider of said selection; and
means for providing information about said resident to said provider.

43. The system of claim 31 wherein said call manager functionality includes an interactive voice response unit selectively providing at least a portion of said resident information and selectively providing at least a portion of said facility information to a calling party.

44. The system of claim 31 wherein said call manager functionality includes interactive voice response unit functionality that enables a calling party to carry out at least one of a set of actions consisting of
pre-arranging visitation with said resident;
making deposits in a commissary account of said resident;
ordering prepaid calling cards for said resident;
refilling prepaid calling cards for said resident;
providing credit card information for use in funding a commissary account of said resident; and
managing debit or other accounts of said resident.

45. The system of claim 31 further comprising interactive voice response functionality linked to said controlled environment facility information management functionality to track a resident's activities and use of facility services.

46. The system of claim 45 wherein said interactive voice response functionality and said facility information management functionality enable a calling party to set up appointments with said resident.

47. The system of claim 46 wherein said facility information management functionality determines said resident's eligibility to take part in said appointment.

48. The system of claim 46 wherein said facility information management functionality determines said resident's availability to take part in said appointment.

49. The system of claim 31 wherein said resident information comprises at least one of identity of said resident, a reason for said resident to be a resident of said controlled environment facility, booking information for said resident, time spent by said resident at said controlled environment facility, appointments for said resident, and identity of family members of said resident.

50. The system of claim 31 wherein said facility information comprise at least one of facility visitation hours, facility location, and facility administrative information.

* * * * *